J. J. MYERS.
VARIABLE SPEED GEAR.
APPLICATION FILED APR. 29, 1911.
1,077,424.
Patented Nov. 4, 1913.
3 SHEETS—SHEET 1.
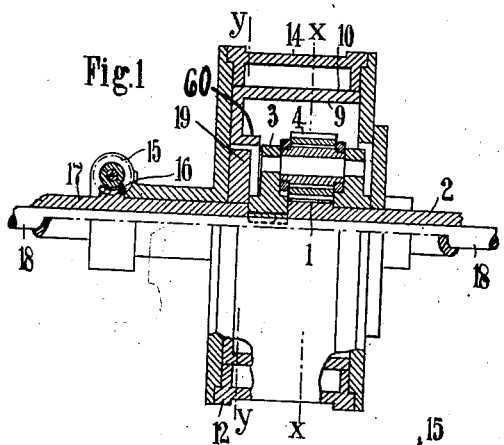
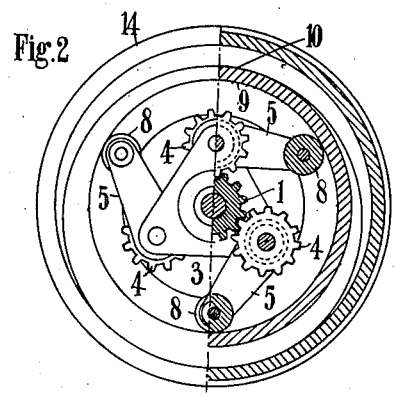
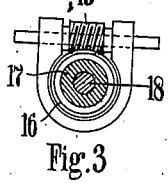
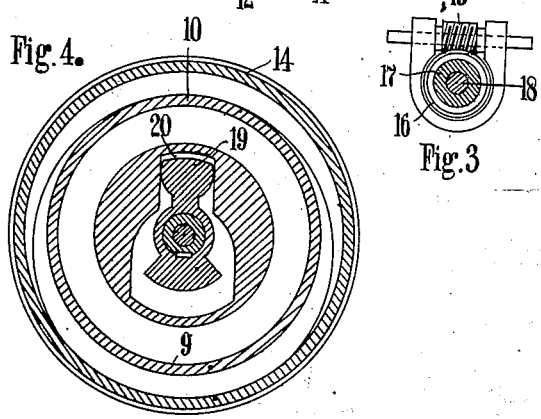
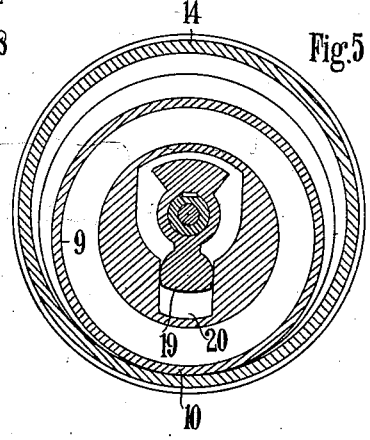
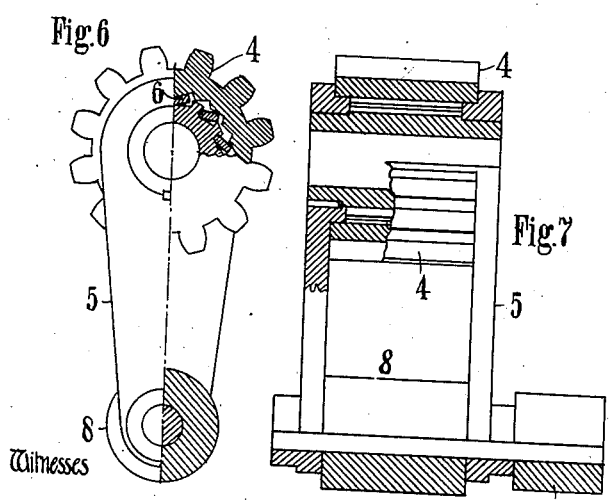
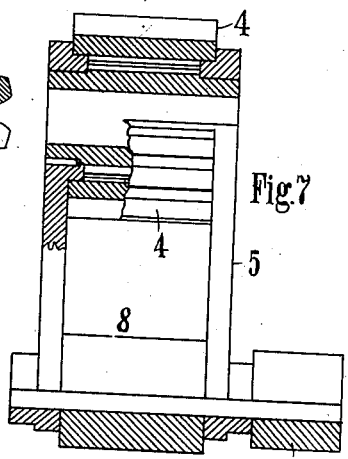
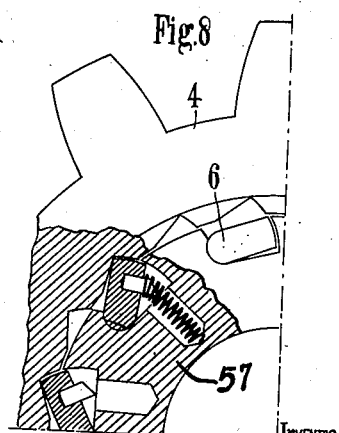
Witnesses
Inventor
James Joseph Myers
Attorney J. J. MYERS.
VARIABLE SPEED GEAR.
APPLICATION FILED APR. 29, 1911.
1,077,424.
Patented Nov. 4, 1913.
3 SHEETS—SHEET 2.
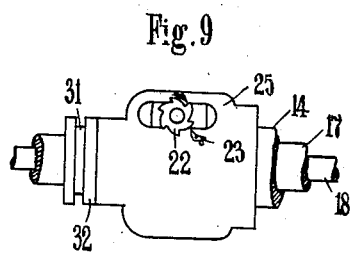
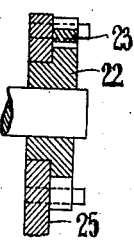
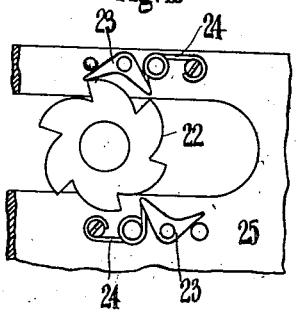
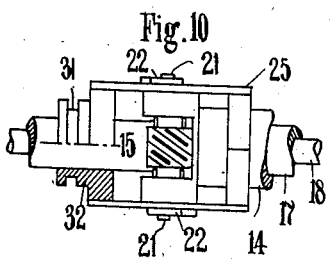
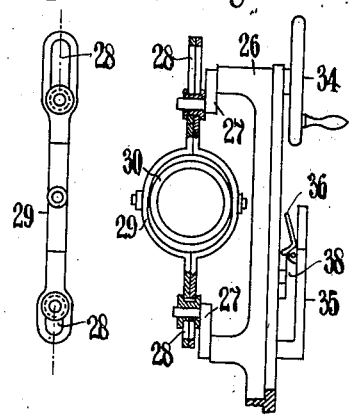
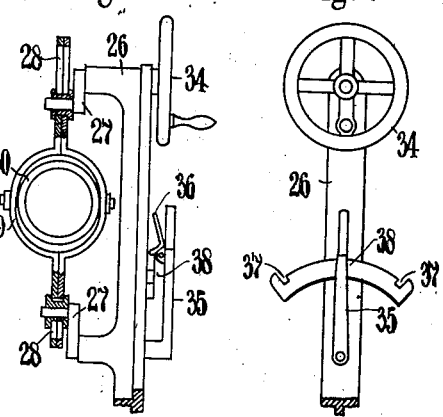
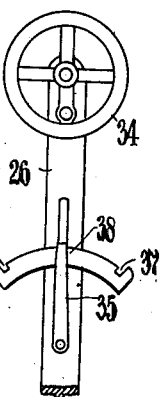
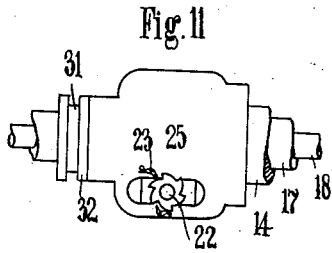
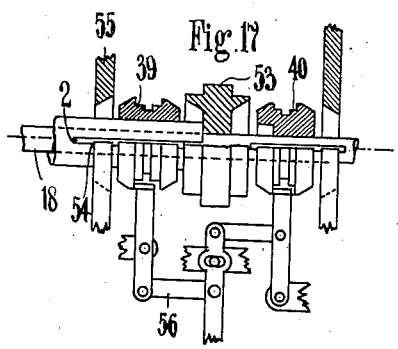
Witnesses.
M. K. Freeman
N. C. Loental
Inventor
James Joseph Myers
A. M. Bunn
Attorney.

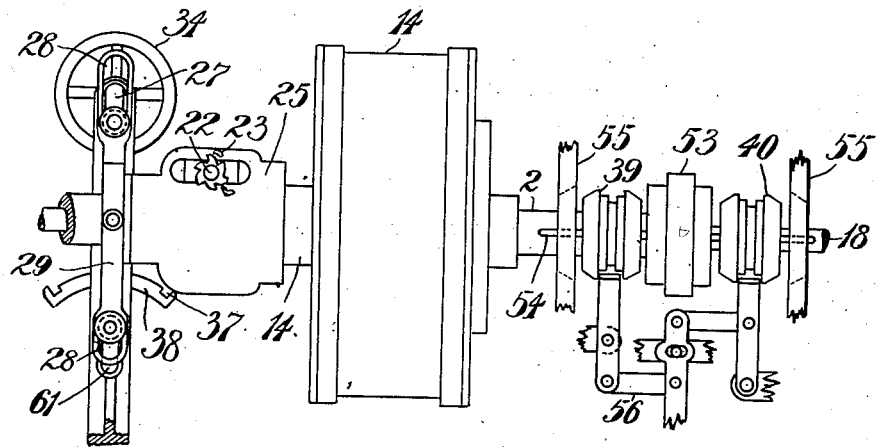
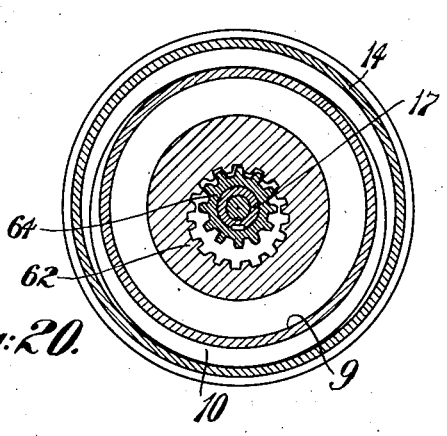
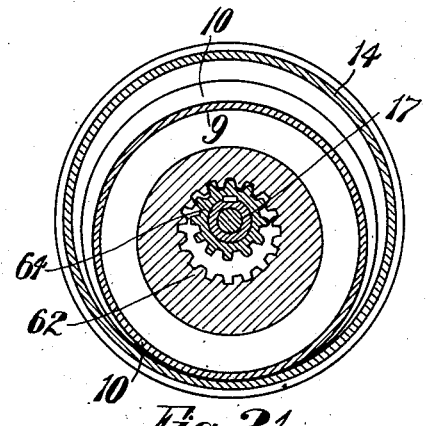
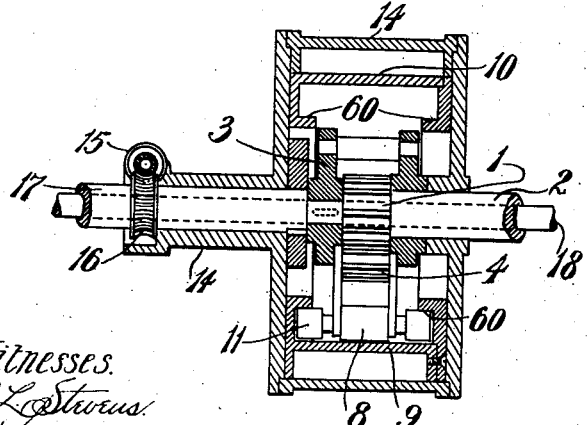

UNITED STATES PATENT OFFICE.

JAMES JOSEPH MYERS, OF THURLES, IRELAND.

VARIABLE-SPEED GEAR.

1,077,424.

Specification of Letters Patent.

Patented Nov. 4, 1913.

Application filed April 29, 1911. Serial No. 624,049.

*To all whom it may concern:*

Be it known that I, JAMES JOSEPH MYERS, a subject of the King of Great Britain, residing at Grallagh House, Thurles, county Tipperary, Ireland, have invented new and useful Improvements in Variable-Speed Gears, of which the following is a specification.

The present invention is designed to provide an improved means of changing the speed of a driven shaft to any desired degree between zero and a maximum in either direction while the driving shaft is running at a constant speed, applicable for transmitting power from any source such as an engine, a turbine, or an electro-motor whether stationary or on a vehicle or vessel; also for use on cranes; for altering the cutting speeds or feeds of machine tools; for altering the rate of distribution on machines for distributing materials; or for any purpose for which a variable speed gear may be required.

My invention relates to improvements in variable speed gears of that class in which a sun wheel engages with a number of planet pinions mounted on a spider and controlled through free wheel or one-way clutches by lever arms whose ends are maintained on a circular track which may be brought from a position concentric with the sun wheel to positions of varying eccentricity, a variable difference of the velocities of spider and sun wheel being thus obtainable.

In variable speed gears of the class referred to, as usually constructed, the spider and sun wheel rotate and the ends of the arms attached to the one-way clutch mechanisms are constrained to follow a circular track or roller path, the center of said path remaining fixed for each particular speed ratio; the speed of the driven part being equal to that of the driver when the path is concentric with the sun wheel and increasing with the eccentricity of the path.

According to the present invention the construction is such that instead of the roller path center being fixed for each speed ratio either the spider or sun-wheel is fixed and the center of the roller path is rotated by the driving shaft around the axis of the sun wheel. Further, the eccentricity of the roller path may be altered while its center is rotating, and the construction is such that this may be done without disturbing the balance of the revolving mechanism. I prefer to employ separate rollers for the forward and return motions of the lever arms with the object of avoiding the wear and loss by friction that would be occasioned by the reversal of a single roller twice in every trip around the roller path and so that the tilting stresses that would be caused by the working pressure if a single overhanging pin were used may be avoided.

When the eccentricity of the roller path is increased from zero to a maximum while its center is being rotated at a constant speed, if the spider is fixed the speed of the sun-wheel will increase from zero to a maximum, or if the sun-wheel is fixed the speed of the spider will increase from zero to a maximum. The maximum in the latter case will be less or greater than the maximum with spider fixed according to whether the roller path center rotates in the same direction as the spider or the opposite.

The invention is illustrated by way of example in the accompanying drawings in which—

Figure 1 shows a side view partly in section of the gearing. Fig. 2 shows an end view with the cover removed and partly a sectional view on the line X—X of Fig. 1. Fig. 3 shows a detail view of the worm gearing for turning the cam wheel. Figs. 4 and 5 show end sectional views on the line Y—Y of Fig. 1. Figs. 6 and 7 show detail views of a planet pinion with its free wheel hub, pair of lever arms, and rollers. Fig. 8 shows details of one form of one-way clutch or free wheel hub mechanism that might be used. Figs. 9, 10, 11, 12, 13, 14, 15 and 16 show detail views of the mechanism for altering the eccentricity of the roller path while its center is revolving. Fig. 17 shows an arrangement of clutches and gearing for obtaining any speed from zero to a maximum in both directions when the case wheel is a rotating part of the mechanism. Fig. 18 shows the mechanism illustrated in Fig. 17 combined with the gearing shown in Fig. 1. Fig. 19 shows a sectional view of the gearing with an alternative construction of cam wheel with a roller path on both sides; and, Figs. 20 and 21 show a spur wheel instead of the balanced lever for changing the position of the roller path in its casing.

Referring now to the drawings, a sun and planet train, composed of a sun-wheel 1 and of a number of planet wheels 4 mounted on one-way clutch mechanisms or free wheel hubs such as the spring controlled slip pawls 6 on the hubs 57 of said wheels. The said hubs 57 are pivotally mounted on the spider 3 which is encircled by a cam wheel 10 whose inner surface 9 bears against the rollers 8 pivoted between pairs of lever arms 5 attached to the free wheel hubs of the planet pinions 4. Other rollers 11 bear continuously on a shoulder 60 formed on the cam wheel 10 as shown in Figure 19.

The spider 3 is attached to a shaft 18 and the sun wheel is integral with a sleeve or hollow shaft 2; or, alternatively, the sun-wheel is attached to the shaft 18 and the spider to a sleeve; or the central shaft 18 may be divided and the spider attached to one part and the sun wheel to the other.

The cam wheel 10 is contained in a case wheel 14 the inner bearing surface of which is eccentric to the sun-wheel to the same extent that the exterior of the cam-wheel is eccentric to its inner bearing surface. A balanced lever 19 engaging in a slot 20 in the cam wheel 10 is attached to a sleeve 17 which may be turned relatively to the case wheel 14 by means of a worm 15 mounted on the case wheel 14 and engaging with a worm wheel 16 integral with the sleeve 17.

In order to turn worm 15 when the case wheel 14 is in motion a pair of ratchet wheels 22 adapted to respectively turn the worm 15 in opposite directions are attached at the ends of the spindle 21 carrying the worm 15, as shown more particularly in Figs. 9, 10, 11, 12 and 13. These ratchet wheels 22 respectively engage with a set of pawls 23 preferably controlled by springs 24, as shown in Fig. 13, and mounted on the opposite sides of a frame 25 mounted upon and adapted to turn with the case wheel 14, but adapted to have a sliding movement thereon in order that one of the pairs of pawls 23 on one side of the frame may be brought into engagement with their ratchet wheel 22 while simultaneously the set of pawls on the other side of the frame are out of engagement with their ratchet wheel and consequently the worm is turned in one direction when the frame carrying the pawls is given a reciprocating motion on one side of a central position on the boss of the case wheel 14, and when it is given a reciprocating motion on the other side of said central position the other set of pawls will engage with the other ratchet wheel 22 and move the worm in the other direction.

In Figs. 14, 15 and 16 the mechanism for giving the frame 25 the desired sliding movement is illustrated.

In a suitable position with regard to the case-wheel 14 is arranged an upright 26 provided with cranks 27, the pins of which engage in slots 28 arranged at the ends of a frame 29 in which is pivotally mounted a strap 30 which is adapted to encircle the collar 32 at the end of the frame 25 in the groove 31 as shown more particularly in Figs. 9, 10 and 11. The upper crank 27 is adapted to be rotated by a hand wheel 34 to reciprocate the frame 29 while the lower crank 27 is adapted to be turned by a lever arm 35 provided with a spring catch 36 which is adapted to move over a sector 38 and to drop into one or other of the slots 37 cut in the sector and consequently to hold the lower crank arm in one or other of three positions.

The lower crank pin forms a fulcrum for the frame 29 to reciprocate upon when at the two extreme positions of the sector and with it the pivoted strap 30 encircling the collar 32 on the pawl frame 25. It will be obvious that by the movement of the frame 29 the pawl frame may be given a reciprocating movement on either side of its central position by the hand wheel and thereby the worm is turned in the desired direction through one set of pawls and one of the ratchet wheels 22.

In order that the case wheel and its inclosed cam wheel may be balanced when running, the material may be so distributed in the cam wheel that it shall be balanced when turning around an axis concentric with its largest circumference, while the material in the case wheel and its covers is so distributed that when the cam wheel is in position the whole shall be balanced when turning around the central shaft. It is clear from the construction, that if the case wheel 14 is rotated by connecting it, or the sleeve 17, to the driving shaft, and if the spider 3 is fixed by fixing the shaft or sleeve to which it is attached, and the sun wheel 1 connected to the driven shaft, the speed of the driven shaft may be changed to any desired degree between zero and a maximum by altering the eccentricity of the roller path in the manner described.

If the sun wheel is fixed and the spider connected to the driven shaft the speed of the latter may likewise be changed to any desired degree between zero and a maximum, but the rotation will be in the opposite direction to that obtained in the former case.

If a variable speed in one direction only is desired, either the spider or the sun wheel may be permanently fixed.

It is shown in Figs. 17 and 18 by way of example, how the gear as described may be applied to impart a speed variable from zero to a maximum in both directions to a wheel 53. Double-ended friction or claw clutches 39 and 40 are slidingly connected to the sun wheel 1 and spider 3 respectively. By means of the lever mechanism 56 the clutches 39 and 40 may be moved simultaneously so as to clutch the sun wheel 1 to the driven wheel 53 and the spider 3 to the fixed frame 55; or the sun wheel 1 may be clutched to the fixed frame 55 at the same time that the spider 3 is clutched to the wheel 53.

As shown in Fig. 19 the cam wheel 10 may be provided with two shoulders 60 and a roller 11 such as shown in Fig. 7 may be arranged on both sides of the lever arms 5 adapted to rest on said shoulders. The latter construction may conveniently be used with the pawls arranged so that the working pressure bears upon said shoulders 60 instead of on the cylindrical surface 9 of said cam wheel 10.

As shown in Figs. 20 and 21 a spur wheel 64 on the sleeve 17 in mesh with an annular ring of teeth 62 cut on or fixed to the cam wheel 10 concentric with its outside circumference may be substituted for the balanced lever 19 shown in Figs. 4 and 5.

In my Patent No. 1,047,551, dated the 17th December, 1912, I have described a planet gearing with an eccentric track fixed for each speed ratio.

What I claim is:

1. In a variable speed gearing for converting a motion with rotation at constant speed in one direction into a motion of rotation at variable speed in the same or reversed direction by the use of a planet gearing; the combination of a central sun gear wheel mounted upon a sleeve, a spider mounted upon a central shaft carrying said sleeve, a plurality of planet pinions mounted on said spider adapted to rotate freely in one direction and to engage said central sun gear wheel, lever arms adapted to control the rotation of said pinions through one-way clutches, freely revoluble rollers mounted at the free ends of said lever arms, a rotating cam having an eccentric roller track encircling and in engagement with said rollers and adapted to swing backward and forward said lever arms, a circular shoulder projecting from said eccentric track, secondary rollers at the ends of said levers bearing against said circular shoulder and means for adjusting the eccentricity of said roller track to vary through said lever arms the rotation in one direction of said pinions on their axes.

2. In a variable speed gearing for converting a motion with rotation at constant speed in one direction into a motion of rotation at variable speed in the same or reversed direction by the use of a planet gearing; the combination of a central sun gear wheel mounted upon a sleeve, a spider mounted upon a central shaft carrying said sleeve, a plurality of planet pinions mounted on said spider adapted to rotate freely in one direction and to engage said central sun gear wheel, lever arms adapted to control the rotation of said pinions, a balanced rotating cam having an eccentric groove encircling and in engagement with and adapted to swing backward and forward said lever arms, means for adjusting the eccentricity of said eccentric groove to vary through said lever arms the rotation in one direction of said pinions on their axes, a wheel loose on said central shaft, a double clutch slidingly connected with said central gear wheel and adapted to couple said central gear wheel with said loose wheel or to part of the frame, a similar clutch on the other side of said loose wheel slidingly connected with said spider and adapted to clutch said spider with said loose wheel or to the frame.

3. In a variable speed gearing for converting a motion with rotation at constant speed in one direction into a motion of rotation at variable speed in the same or reversed direction by the use of a planet gearing; the combination of a central sun gear wheel mounted upon a sleeve, a spider mounted upon a central shaft carrying said sleeve, a plurality of planet pinions mounted on said spider adapted to rotate freely in one direction and to engage said central sun gear wheel, lever arms adapted to control the rotation of said pinions, a balanced rotating cam having an eccentric groove encircling and in engagement with and adapted to swing backward and forward said lever arms, means for adjusting the eccentricity of said eccentric groove to vary through said lever arms the rotation in one direction of said pinions on their axes, a wheel loose on said central shaft, a double clutch slidingly connected with said central gear wheel and adapted to couple said central gear wheel with said loose wheel or to part of the frame, a similar clutch on the other side of said loose wheel slidingly connected with said spider and adapted to clutch said spider with said loose wheel or to the frame, and lever mechanism adapted to move said clutches simultaneously so that when the clutch connected with said central gear wheel has been moved to a position in which said loose wheel is coupled to said central gear wheel the clutch connected with said spider is moved to a position in which said spider is coupled to the frame and vice versa.

4. In a variable speed gearing for converting a motion with rotation at constant speed in one direction into a motion of rotation at variable speed in the same or reversed direction by the use of a planet gearing; the combination of a central sun gear wheel mounted upon a sleeve holding a spider mounted upon a central shaft carrying said sleeve, a plurality of planet pinions mounted on spindles in said spider adapted to rotate freely in one direction and to engage said central sun gear wheel, lever arms mounted on said spindles and adapted to control the rotation of said pinions through one-way clutches, freely revoluble rollers mounted at the free ends of said lever arms, a rotating case wheel with a bearing surface eccentric with said sun gear wheel, a cam wheel mounted in said case wheel with a bearing surface engaging the bearing surface of said case wheel, a roller track in said cam wheel eccentric to its bearing surface encircling in engagement with said rollers and adapted to swing backward and forward said lever arms, means for adjusting the position of said cam wheel in said rotating case wheel to vary the rotation in one direction of said pinions on their axes, a wheel loose on said central shaft, a double clutch slidingly connected with said central gear wheel and adapted to couple the said gear wheel with said loose wheel or to a part of the frame, a similar clutch on the other side of said loose wheel slidingly connected with said spider and adapted to clutch said spider with said loose wheel or to the frame and lever mechanism adapted to move said clutches simultaneously so that when the clutch connected with said central gear wheel has been moved to a position in which said loose wheel is coupled to said central gear wheel the clutch connected with said spider is moved to a position in which said spider is coupled to the frame and vice versa.

In testimony whereof I have signed my name to this specification in the presence of the two subscribing witnesses.

JAMES JOSEPH MYERS.

Witnesses:
 JAMES SMITH,
 DENIS DESMOND.